(12) United States Patent
Hong et al.

(10) Patent No.: US 12,401,732 B2
(45) Date of Patent: Aug. 26, 2025

(54) HINGE DEVICE OF PORTABLE TERMINAL WITH FOLDABLE STRUCTURE

(71) Applicant: FINE M-TEC CO., LTD, Anyang-si (KR)

(72) Inventors: Sung Chun Hong, Seoul (KR); Hyun Taek Jung, Seoul (KR); Chang Soo Kim, Incheon (KR)

(73) Assignee: FINE M-TEC CO., LTD, Anyang-si (KR)

( * ) Notice: Subject to any disclaimer, the term of this patent is extended or adjusted under 35 U.S.C. 154(b) by 61 days.

(21) Appl. No.: 18/548,107

(22) PCT Filed: Mar. 17, 2022

(86) PCT No.: PCT/KR2022/003734
§ 371 (c)(1),
(2) Date: Aug. 28, 2023

(87) PCT Pub. No.: WO2022/197114
PCT Pub. Date: Sep. 22, 2022

(65) Prior Publication Data
US 2024/0129386 A1   Apr. 18, 2024

(30) Foreign Application Priority Data

Mar. 18, 2021   (KR) .......................... 10-2021-0035321

(51) Int. Cl.
*E05D 3/06*   (2006.01)
*F16C 11/04*   (2006.01)
(Continued)

(52) U.S. Cl.
CPC ........... *H04M 1/0214* (2013.01); *F16C 11/04* (2013.01); *G06F 1/1652* (2013.01);
(Continued)

(58) Field of Classification Search
CPC .. E05D 3/12; E05D 3/18; E05D 3/122; E05D 3/06; E05D 3/10; E05D 7/0045;
(Continued)

(56) References Cited

U.S. PATENT DOCUMENTS 10,664,021 B1 * 5/2020 Hsu ...................... H04B 1/3888
11,214,999 B2 * 1/2022 Wong ...................... E05D 11/08
(Continued)

FOREIGN PATENT DOCUMENTS

CN   111862801 A  * 10/2020
JP   2016-080031 A    5/2016
(Continued)

*Primary Examiner* — Chuck Y Mah
(74) *Attorney, Agent, or Firm* — NKL Law; Jae Youn Kim

(57) ABSTRACT

A hinge device of a portable terminal with a foldable structure according to the present invention includes: housing positioned between one end of a first body and one end of a second body; first hinge blade and second hinge blade fixed to the first body and the second body, respectively, and supported against the housing to rotate at a predetermined angle between an 'unfolded position' in which the first body and the second body are placed on the same horizontal line and a 'folded position' in which the first body and the second body face each other and thus come into contact with each other; and first interlocking gear and second interlocking gear for interlocking the first hinge blade and the second hinge blade with each other so that the first hinge blade and the second hinge blade move relative to each other, wherein the first interlocking gear and the second interlocking gear are mounted on the corresponding housing in such a way as to rotate relative to each other by a predetermined angle around gear shafts by engaging with each other and, on the upper sides of the first interlocking gear and the second interlocking gear a plurality of first gear-side protrusions and second gear-side protrusions are arranged radially in cir- (Continued)

cumferential directions around the gear shafts, and on the undersides of the first hinge blade and the second hinge blade a plurality of first blade-side protrusions and second blade-side protrusions engaging with the first gear-side protrusions and the second gear-side protrusions through rotations are arranged radially in circumferential directions around rotary axes of the first and second hinge blades.

11 Claims, 12 Drawing Sheets

(51) Int. Cl.
  *G06F 1/16* (2006.01)
  *H04M 1/02* (2006.01)
  *E05D 3/12* (2006.01)
  *E05D 11/08* (2006.01)
  *E05D 11/10* (2006.01)

(52) U.S. Cl.
  CPC ........ *G06F 1/1681* (2013.01); *H04M 1/0268* (2013.01); *E05D 3/122* (2013.01); *E05D 11/087* (2013.01); *E05D 11/1078* (2013.01); *E05Y 2201/218* (2013.01); *E05Y 2999/00* (2024.05)

(58) Field of Classification Search
  CPC . E05D 11/087; E05D 11/082; E05D 11/1078; E05D 2011/085; E05D 2007/0072; G06F 1/1681; G06F 1/1616; G06F 1/1618; G06F 1/1652; G06F 1/168; E05Y 2900/606; E05Y 2900/602; E05Y 2999/00; E05Y 2201/218; H04M 1/0214; H04M 1/0216; H04M 1/0222; H04M 1/022; H04M 1/0268; H05K 5/0226; F16C 11/04; F16C 11/10
  See application file for complete search history.

(56) References Cited

U.S. PATENT DOCUMENTS

| | | | |
|---|---|---|---|
| 11,435,785 B2 * | 9/2022 | Song | G06F 1/1652 |
| 11,537,173 B2 * | 12/2022 | Kim | G06F 1/1652 |
| 11,624,221 B1 * | 4/2023 | Hsu | E05D 3/122 16/354 |
| 11,720,153 B2 * | 8/2023 | Hsu | G06F 1/1681 16/250 |
| 11,956,378 B2 * | 4/2024 | Kang | G06F 1/1652 |
| 2016/0010374 A1 * | 1/2016 | Hsu | G06F 1/1681 74/414 |
| 2020/0103935 A1 | 4/2020 | Hsu | |
| 2021/0173449 A1 * | 6/2021 | Yao | G06F 1/1616 |
| 2021/0267076 A1 * | 8/2021 | Zhang | H05K 5/0226 |
| 2021/0373611 A1 * | 12/2021 | Lee | G06F 1/1681 |
| 2022/0206543 A1 * | 6/2022 | Kim | G06F 1/1641 |
| 2022/0317730 A1 * | 10/2022 | Cho | G06F 1/1652 |
| 2022/0412138 A1 * | 12/2022 | Peng | E05D 3/122 |
| 2023/0213056 A1 * | 7/2023 | Han | G06F 1/1656 455/575.3 |
| 2023/0213983 A1 * | 7/2023 | Yun | H04M 1/022 361/679.27 |
| 2024/0019911 A1 * | 1/2024 | Liu | G06F 1/1681 |

FOREIGN PATENT DOCUMENTS

| | | |
|---|---|---|
| KR | 10-2019-0124110 A | 11/2019 |
| KR | 10-2158620 B1 | 9/2020 |
| KR | 10-2020-0120474 A | 10/2020 |
| KR | 10-2021-0011737 A | 2/2021 |

* cited by examiner

HINGE DEVICE OF PORTABLE TERMINAL WITH FOLDABLE STRUCTURE

TECHNICAL FIELD

The present invention relates to a hinge device for a portable terminal with a foldable structure, and more specifically, to a hinge device for a portable terminal with a foldable structure that is configured to be disposed on the portable terminal to which a flexible display is applied, thereby improving the foldable structure in which the flexible display is stably folded and unfolded.

BACKGROUND ART

Portable terminals are devices that are carried with users, while each having a battery and a display part to thus output information to the display part using the power supplied from the battery.

The portable terminal includes a device for recording and playing videos and a device for displaying graphic user interface (GUI), and examples of the portable terminals include laptops, smartphones, glasses and watches with which screen information is displayed, game machines, and the like.

As the functions of the portable terminals become diversified, further, the portable terminals function as multimedia players having multi-functions such as picture or video taking, music or video file reproducing, game playing, broadcasting receiving, and the like.

To support and increase the functions of the portable terminals, improvements in structures and/or software of the portable terminals may be required.

Further, the portable terminals are developed with various designs, and so as to satisfy the needs of users for newer and more different designs, endeavors for developing the portable terminals to new shapes have been made.

In this case, the new shapes include structural changes and improvements in the portable terminals so that the portable terminals can be more conveniently used by the users.

As one of the structural changes and improvements, a portable terminal whose at least a portion of the display part is bendable or foldable is in the limelight.

However, a complex configuration is needed in supplying power or external force required to allow the portable terminal to be bent or folded, thereby disadvantageously making an outer appearance of the portable terminal not simple and causing the thickness of the portable terminal to increase.

When a flexible display panel is folded, further, it is changed in length, and accordingly, a hinge device used for a conventional folder type portable terminal cannot be used for the flexible display panel.

Besides, most of conventional hinge devices applied to the flexible display panel are configured to have an interlocking structure, in which two bodies move relative to each other, configured to have gears simply engaging with each other in rotating directions of the bodies (See Korean Patent Application Laid-open No. 10-2019-0124110). However, the interlocking structure may be poor in durability, generate vibrations or noise, become complicated in manufacturing processes, and cause high component costs.

Therefore, there is an urgent need for developing a new and efficient hinge device for a portable terminal with a foldable structure that is capable of equally folding both ends of a flexible display panel to each other at the same angle to thus prevent changes in length of the flexible display panel from occurring.

DISCLOSURE

Technical Problem

Accordingly, the present invention has been made in view of the above-mentioned problems occurring in the related art, and it is an object of the present invention to provide a hinge device for a portable terminal with a foldable structure that is capable of improving durability, reducing vibrations or noise, being simple in a manufacturing process, and lowering component costs.

Technical Solution

To accomplish the above-mentioned objects, according to the present invention, a hinge device may include: housing positioned between one end of a first body and one end of a second body; first hinge blade and second hinge blade fixed to the first body and the second body, respectively, and supported against the housing to rotate at a predetermined angle between an 'unfolded position' in which the first body and the second body are placed on the same horizontal line and a 'folded position' in which the first body and the second body face each other and thus come into contact with each other; and first interlocking gear and second interlocking gear for interlocking the first hinge blade and the second hinge blade with each other so that the first hinge blade and the second hinge blade move relative to each other, wherein the first interlocking gear and the second interlocking gear may be mounted on the corresponding housing in such a way as to rotate relative to each other by a predetermined angle around gear shafts by engaging with each other and, on the upper sides of the first interlocking gear and the second interlocking gear a plurality of first gear-side protrusions and second gear-side protrusions may be arranged radially in circumferential directions around the gear shafts, and on the undersides of the first hinge blade and the second hinge blade a plurality of first blade-side protrusions and second blade-side protrusions engaging with the first gear-side protrusions and the second gear-side protrusions through rotations may be arranged radially in circumferential directions around rotary axes of the first and second hinge blades.

According to the present invention, further, the first gear-side protrusions and the second gear-side protrusions may protrude upwardly from tops of the first interlocking gear and the second interlocking gear.

According to the present invention, moreover, the ends of the first gear-side protrusions and the second gear-side protrusions and the ends of the first blade-side protrusions and the second blade-side protrusions may be semicircular or hemispherical.

According to the present invention, furthermore, the first interlocking gear and the second interlocking gear may be formed such that the gear portions of the first interlocking gear and the second interlocking gear have no overlapping with the portions of the first gear-side protrusions and the second gear-side protrusions.

According to the present invention, further, the gear shafts for the first and second interlocking gears may be spaced apart from each other in a diagonal direction with respect to the center line of the corresponding housing.

According to the present invention, in addition, a pair of semi-circular protrusions may be formed on the inner wall surfaces of both sides of the housing, and semi-circular grooves may be formed on the first hinge blade and second hinge blade, respectively, to be rotated by fitting the semicircular protrusions thereto.

According to the present invention, further, each pair of semicircular protrusions may be spaced apart from each other by a predetermined distance to allow a given curvature radius formed on a folding portion of a flexible display panel to be accommodated in the predetermined distance at the 'folding position'.

According to the present invention, the hinge device may further include tension mechanism comprising a tension fixing member having a first guide shaft and a second guide shaft disposed thereon in the direction of the hinge axial line, a first tension blade and a second tension blade fitted to the first guide shaft and the second guide shaft, rotating supportedly thereagainst, and movable to axial directions, tension operating members movably fitted to the first guide shaft and the second guide shaft in the axial directions, and elastic members for applying elastic forces to the tension operating members.

According to the present invention, further, a plurality of inclined protrusions may be formed on the tension operating members in circumferential direction around the first guide shaft and the second guide shaft, and another plurality of inclined protrusions that can be fitted corresponding to the inclined protrusions may be formed on the first tension blade and the second tension blade.

According to the present invention, additionally, the tension mechanism may have tension guide protrusions protruding from the first tension blade and the second tension blade, respectively, and the tension guide protrusions may be inserted into and guided in rectangular tension guide holes formed on one side of the first hinge blade and the second hinge blade.

According to the present invention, each tension mechanism may further include elastic members elastically installed at the interlocking portions between the first and the second hinge blade and the first and the second tension blade, and located furthest from the rotation axis of the first tension blade and the second tension blade.

Advantageous Effects

According to the present invention, the hinge device is configured to allow a structure for interlocking the first and second bodies with each other to be mounted on the housing so that upon the folding operations of the first and second bodies, the first and second bodies rotate relative to each other in vertical directions by means of rotations caused by the engagement of the gears horizontally rotating, thereby distributing loads applied upon the folding operations, minimizing the occurrence of gaps between the gears to thus reduce vibrations and noise, being simplified in the interlocking structure to achieve the improvement of durability, obtaining the reduction of component costs, and being simple in the manufacturing process.

According to the present invention, further, the tension mechanisms are provided interlockingly with the hinge blades upon the rotation of the hinge blades, thereby distributing the loads applied to the hinge blades to prevent the breakage of the hinge blades due to high loads from occurring and decreasing the gaps occurring upon the folding operations to suppress the generation of vibrations and noise due to the gaps.

Figure 1:
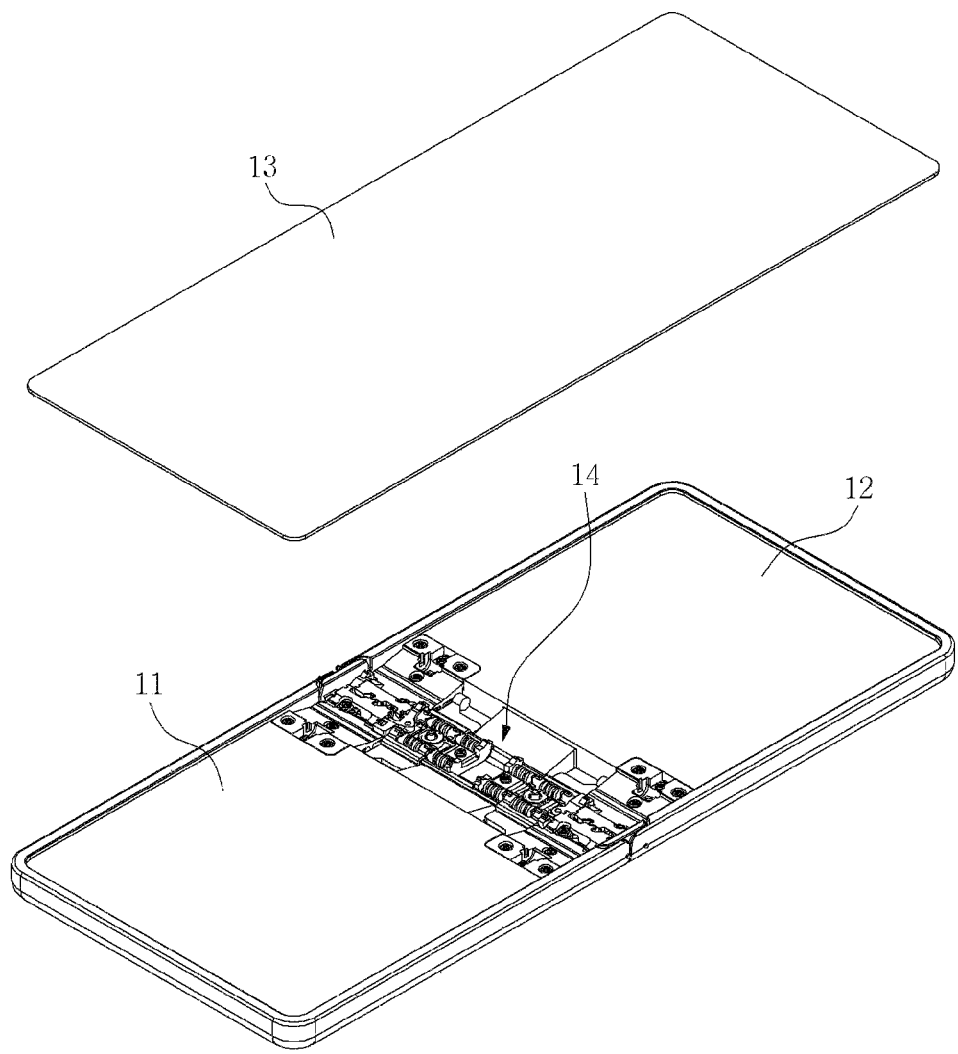
FIG. 1 is a perspective view showing a state where a flexible display panel is separated from a first body and a second body at a position where a portable terminal applied to the present invention is unfolded.

EXPLANATIONS OF REFERENCE NUMERALS 11, 12: First and second bodies
13: Flexible display panel
14: Hinge device
21, 22: First and second hinge blades
31: Housing
41, 42: Interlocking gears
44a, 44b: Gear-side protrusions
45a, 45b: Blade-side protrusions
50: Tension mechanism
53, 54: Tension operating members
55, 56: First and second tension blades

BEST MODE FOR INVENTION

Hereinafter, the present invention will now be described in detail with reference to the attached drawings. Embodiments of the present invention as will be discussed later will be in detail described so that it may be carried out easily by those having ordinary skill in the art. It should be understood that the embodiments of the present invention are different from one another but not mutually exclusive. For example, specific shapes, structures, and characteristics described in an embodiment of the present invention may be adopted in another embodiment of the present invention without departing from the spirit and scope of the invention. Further, it should be understood that the positions or arrangements of the individual components in the embodiments disclosed of the invention are changed without departing from the spirit and scope of the invention. This application is intended to cover any adaptations or variations of the present invention. Therefore, it is manifestly intended that this invention be limited only by the claims and the equivalents thereof. In the description, it should be noted that the parts corresponding to those of the drawings are indicated by corresponding reference numerals.

Hereinafter, an explanation of an embodiment of the present invention will be given in detail with reference to the attached drawings.

FIG. 1 is a perspective view showing a state where a flexible display panel 13 is separated from first and second bodies 11 and 12 at a position where a portable terminal applied to the present invention is unfolded, and in this case, a hinge device 14 is connected between one end of a folding portion of the first body 11 and one end of a folding portion of the second body 12 facing the folding portion of the first body 11.

The flexible display panel 13 has a given size so that it can cover the entire area of the first and second bodies 11 and 12 including the hinge device 14, and further, the flexible display panel 13 is fixed to the entire inner surface of the first and second bodies 11 and 12 excepting the hinge device 14 through attaching means such as an adhesive and the like.

Figure 2:
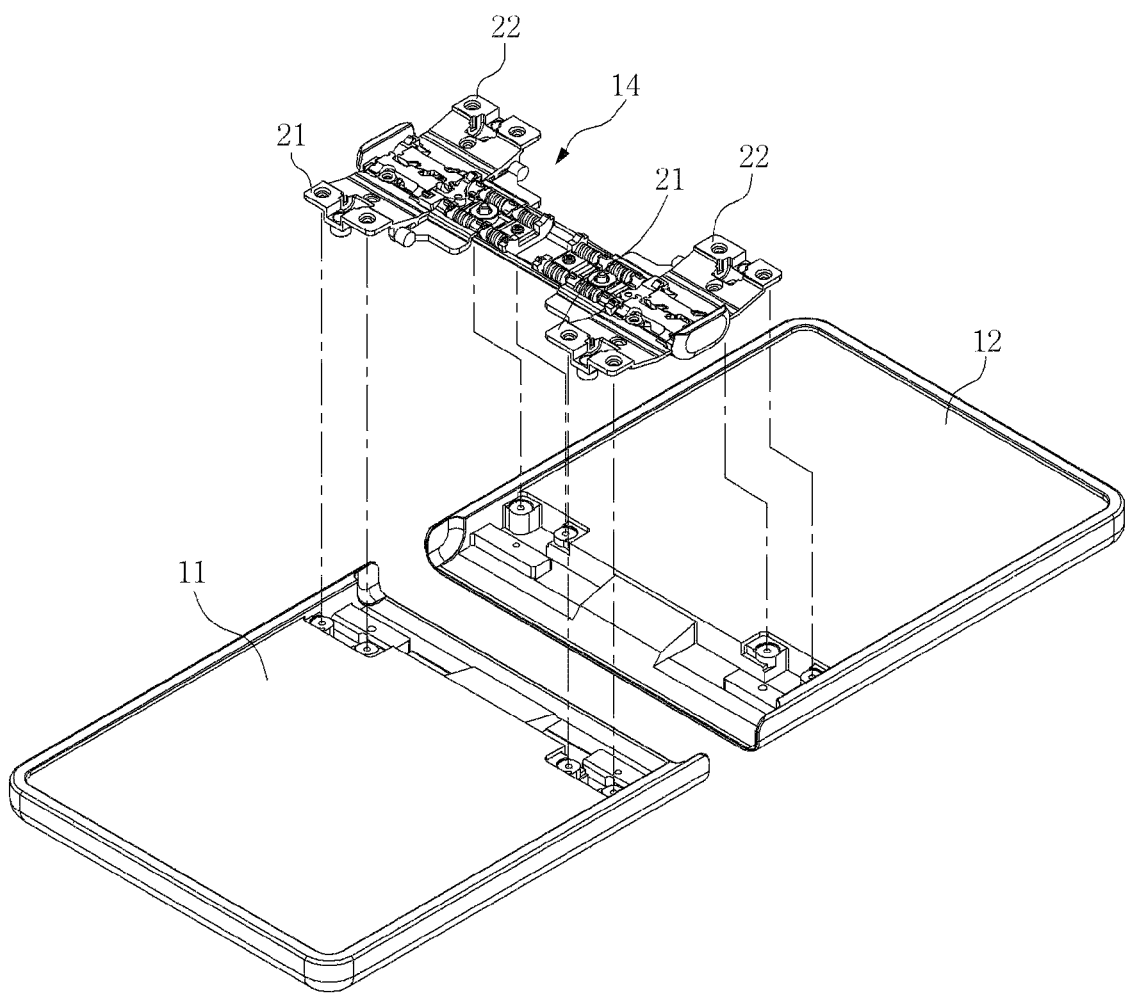
FIG. 2 is a perspective view showing a coupling relation of a hinge device according to the present invention to the first and second bodies of FIG. 1.

FIG. 2 is a perspective view showing a coupling relation between the first and second bodies 11 and 12 and the hinge device 14, and in this case, the hinge device 14 includes first hinge blades 21 and second hinge blades 22 fixed to the first body 11 and the second body 12 by means of screws (not shown), so that the hinge device 14 is fixed to the first and second bodies 11 and 12.

Figure 3:
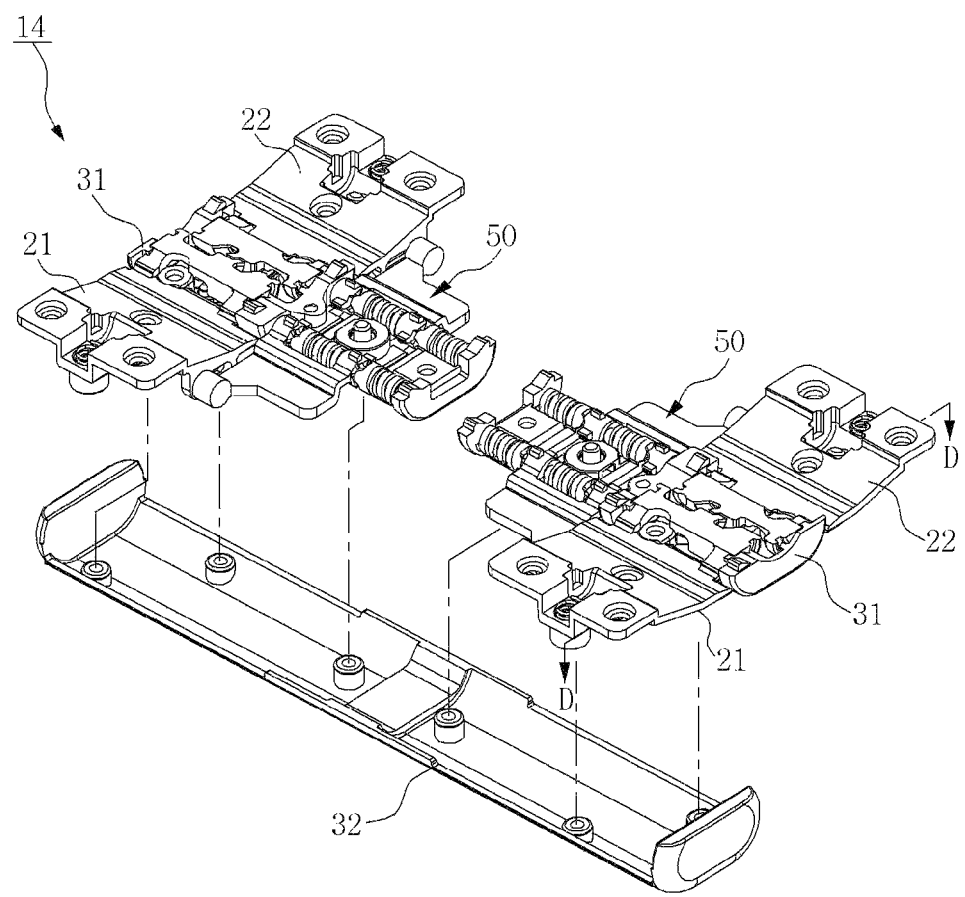
FIG. 3 is an exploded perspective view showing main components of the hinge device according to the present invention.

FIG. 3 is an exploded perspective view showing main components of the hinge device 14. As shown, the hinge device 14 includes the first and second hinge blades 21 and 22 mounted on housing 31 in such a way as to be fixed to the first and second bodies 11 and 12 to interlockingly rotate between an 'unfolding position' and a 'folding position' of the first and second bodies 11 and 12 and tension mechanisms 50 adapted to perform free-stop functions between the 'unfolding position' and the 'folding position', while the first and second hinge blades 21 and 22 are rotating.

The first and second hinge blades 21 and 22, the housing 31, and the tension mechanisms 50 are provided in pair so that the respective pairs have the same configuration as each other on both ends of the first and second bodies 11 and 12 connected to each other, thereby allowing the first and second bodies 11 and 12 to be stably folded and unfolded. In this case, the housings 31 and the tension mechanisms 50 are fixed to a single hinge cover 32 by means of screws (not shown).

Figure 4:
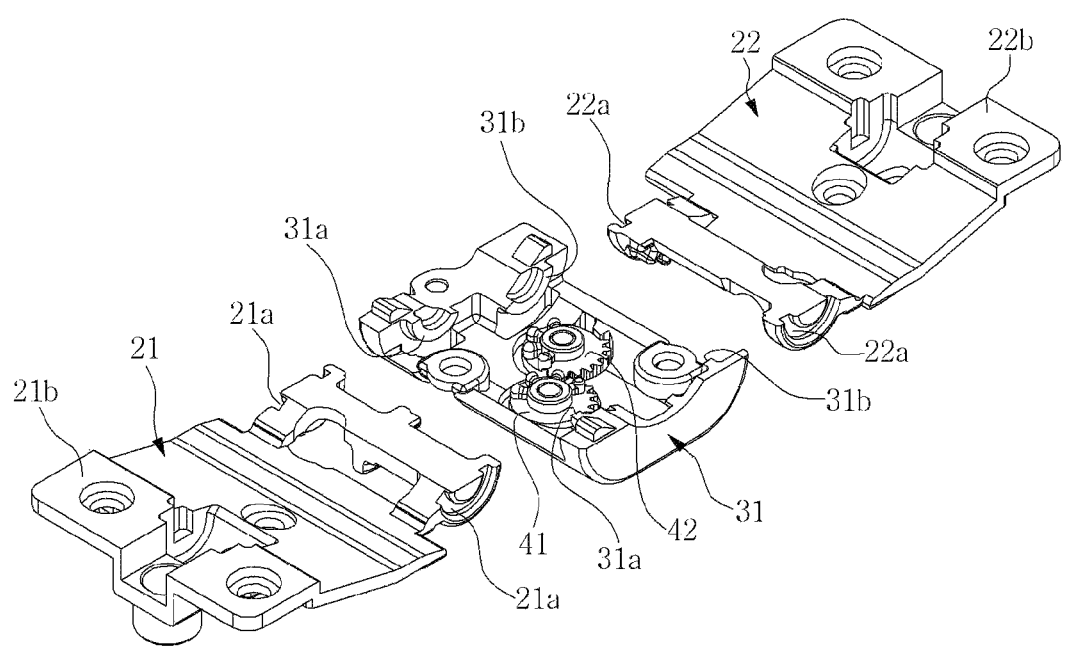
FIG. 4 is an exploded perspective view showing a rotation-supporting structure of first and second hinge blades in the hinge device according to the present invention
Figure 5A:
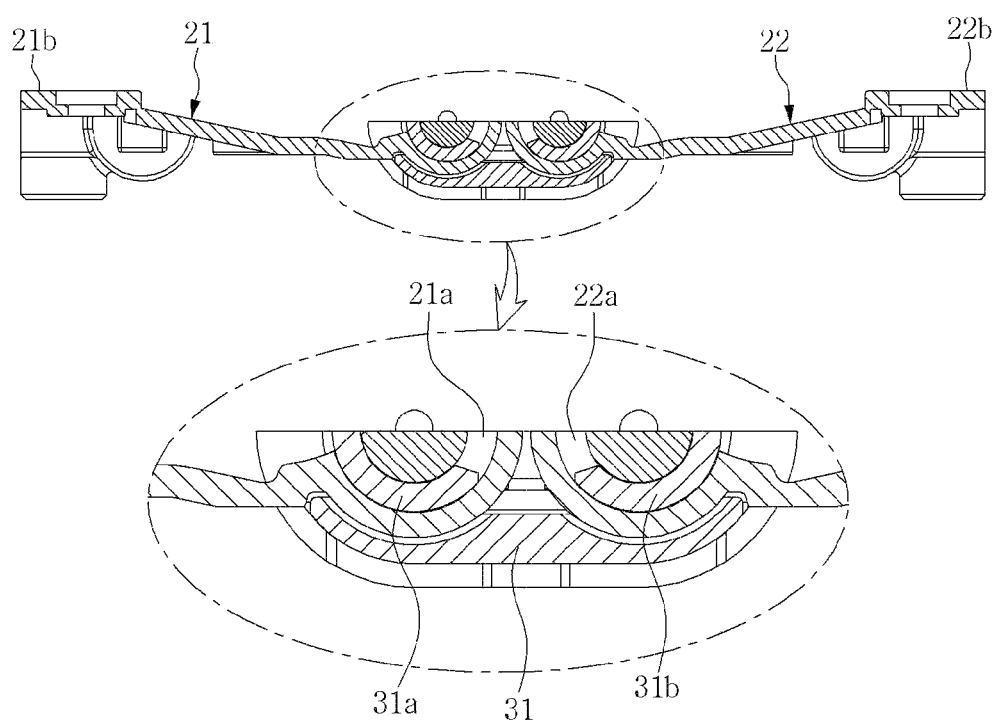
FIGS. 5a and 5b are sectional views taken along the line D-D of FIG. 3, which show the rotation-supporting structure of the first and second hinge blades of FIG. 4.
Figure 5B:
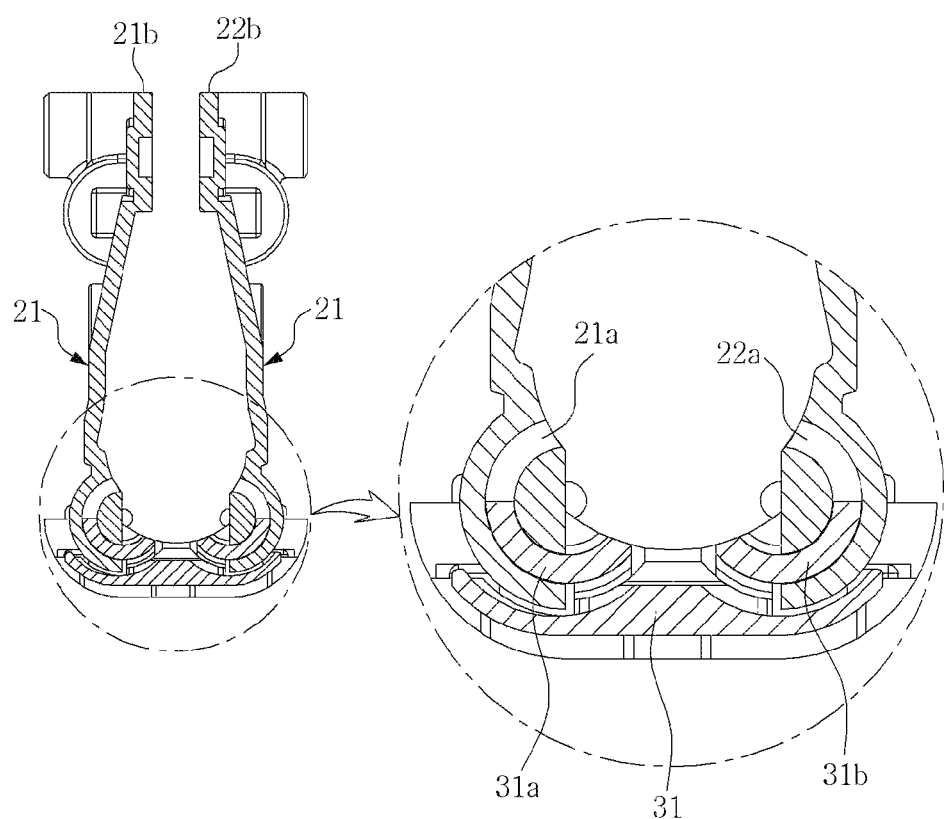

FIGS. 4, 5a and 5b show a rotation-supporting structure of the first and second hinge blades 21 and 22 of the hinge device 14 according to the present invention. FIGS. 5a and 5b are sectional views taken along the line D-D of FIG. 3, but to easily explain the rotation-supporting structure of the first and second hinge blades 21 and 22 as shown in FIG. 4, some components unnecessary are omitted. As shown, the rotation-supporting structure of the first and second hinge blades 21 and 22 includes a pair of semicircular protrusions 31a and 31b spaced apart from each other by a predetermined distance on the inner wall surfaces of both sides of each housing 31 and a pair of semicircular grooves 21a and 22a formed on the first and second hinge blades 21 and 22 in such a way as to allow the semicircular protrusions 31a and 31b to be fitted correspondingly thereto so that the semicircular grooves 21a and 22a supportedly rotate.

The semicircular grooves 21a and 22a of the first and second hinge blades 21 and 22 are formed on the opposite ends to fixing portions 21b and 22b to which the first and second bodies 11 and 12 are fixed, so that the fixing portions 21b and 22b rotate to a predetermined angle around the semicircular grooves 21a and 22a to allow the first and second bodies 11 and 12 to supportedly rotate between the 'unfolding position' and the 'folding position'.

In this case, a distance between the semicircular protrusions 31a and 31b is set to allow a folding space in which a given curvature radius formed on a folding portion of the flexible display panel 13 at the 'folding position' is accommodated to be formed between the first and second hinge blades 21 and 22.

According to the present invention, the semicircular grooves 21a and 22a are formed on the first and second hinge blades 21 and 22, and the semicircular protrusions 31a and 31b are formed on the housing 31. However, of course, the semicircular protrusions 31a and 31b may be formed on the first and second hinge blades 21 and 22, and the semicircular grooves 21a and 22a may be formed on the housing 31.

An explanation of the rotation-supporting structure of the first and second hinge blades 21 and 22 have been given in the above, but any structure capable of supportingly rotating the first and second bodies 11 and 12 may be coupled to interlocking means as will be discussed later and thus applied to the present invention.

Figure 6:
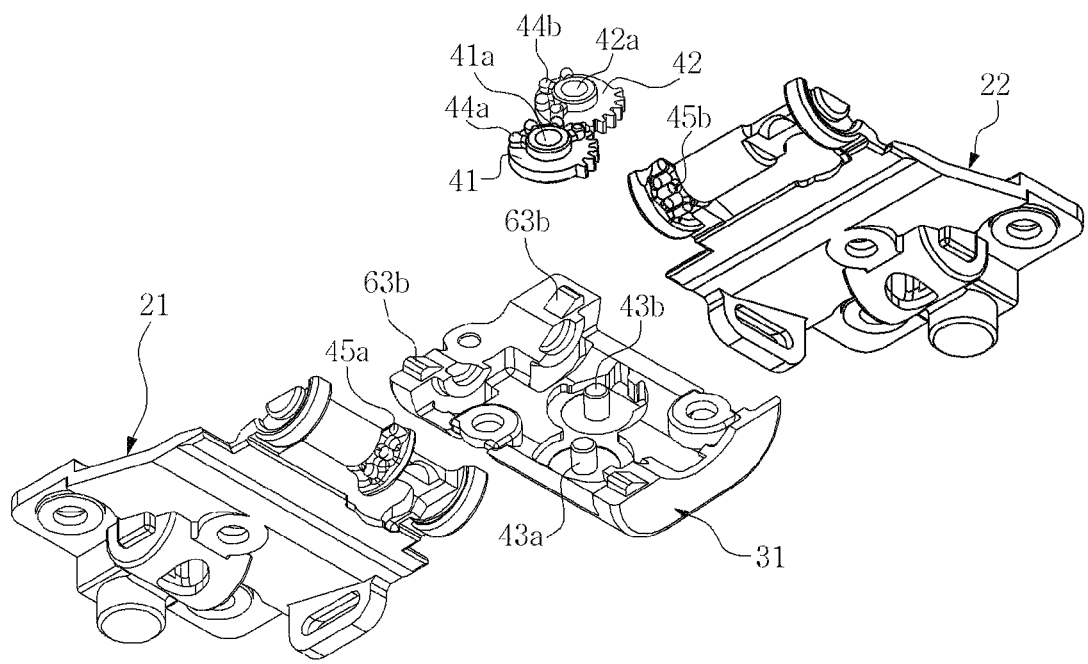
FIG. 6 is an exploded perspective view showing an interlocking structure between the first and second hinge blades and interlocking gears in the hinge device according to the present invention.
Figure 7:
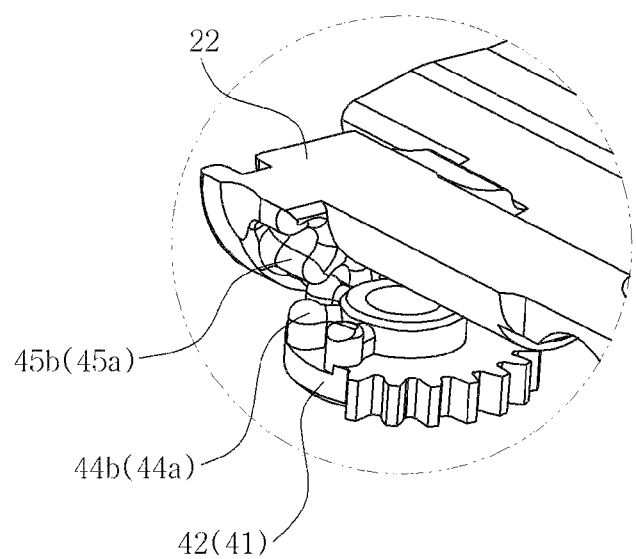
FIG. 7 is a perspective view showing a main portion of the interlocking structure of the first and second hinge blades in the hinge device according to the present invention.

FIGS. 6 and 7 show the first and second hinge blades 21 and 22, the housing 31, and a pair of interlocking gears 41 and 42, and in this case, the pair of interlocking gears 41 and 42 as the interlocking means for moving the first hinge blade 21 and the second hinge blade 22 relative to each other is located on the housing 31.

The interlocking gears 41 and 42 are located between undersides of the first and second hinge blades 21 and 22 and top of the housing 31. The interlocking gears 41 and 42 have shaft holes 41a and 42a formed at the centers thereof and thus fitted to gear shafts 43a and 43b formed on the housing 31 so that the interlocking gears 41 and 42 engage with each other and are rotatable relative to each other by a predetermined angle around the gear shafts 43a and 43b of the housing 31.

Further, first and second gear-side protrusions 44a and 44b protrude from tops of the interlocking gears 41 and 42 in such a way as to be located radially in circumferential directions around rotary axial lines of the gear shafts 43a and 43b, and first and second blade protrusion 45a and 45b are formed radially on the undersides of the first and second hinge blades 21 and 22 in circumferential directions around the rotary axes of the first and second hinge blades 21 and 22 in such a way as to engage with the first and second gear-side protrusions 44a and 44b through rotations.

Further, it is desirable that the engaging gear portions of the first and second interlocking gears 41 and 42 be not overlapped with the protrusion portions of the first and second gear-side protrusions 44a and 44b. To do this, the gear shafts 43a and 43b for the first and second interlocking gears 41 and 42 are spaced apart from each other in a diagonal direction with respect to the center line of the housing 31. As a result, rotation loads are distributed, and the first and second bodies 11 and 12 interlock with each other and thus perform stable rotations.

In this case, the first and second blade-side protrusions 45a and 45b of the first and second hinge blades 21 and 22 are arranged radially in the circumferential directions around the rotary axial lines of the first and second hinge blades 21 and 22 and thus interlock with the first and second gear-side protrusions 44a and 44b rotating horizontally, so that the first and second hinge blades 21 and 22 interlock with each other through vertical rotations.

The first and second gear-side protrusions 44a and 44b protrude upwardly from tops of the first and second interlocking gears 41 and 42 in such a way as to be arranged radially in the circumferential directions, and when they engage with the first and second blade-side protrusions 45a and 45b, the ends of the first and second blade-side protrusions 45a and 45b come into contact with tops of the first and second interlocking gears 41 and 42 on a regular basis and then engage with the first and second gear-side protrusions 44a and 44b, so that the rotations of the first and second hinge blades 21 and 22 can be constantly kept, without any changes in height.

Further, the ends of the first and second gear-side protrusions 44a and 44b and the ends of the first and second blade-side protrusions 45a and 45b are semicircular or hemispherical, so that the first and second hinge blades 21 and 22 and the first and second interlocking gears 41 and 42 rotating to the predetermined angle around the rotary axial lines in the directions crossing each other at a right angle can accurately engage with each other, without any gaps therebetween.

According to the interlocking structure of the first and second hinge blades 21 and 22, the first and second interlocking gears 41 and 42 engage with each other by means of the first and second gear-side protrusions 44a and 44b engaging with the first and second blade-side protrusions 45a and 45b, so that even if only one of the first and second hinge blades 21 and 22 rotates to the 'folding position' or the 'unfolding position', the other hinge blade moves relative to one hinge blade in the opposite direction to the rotation direction of one hinge blade and rotates to the 'folding position' or the 'unfolding position', together with one hinge blade.

Figure 9:
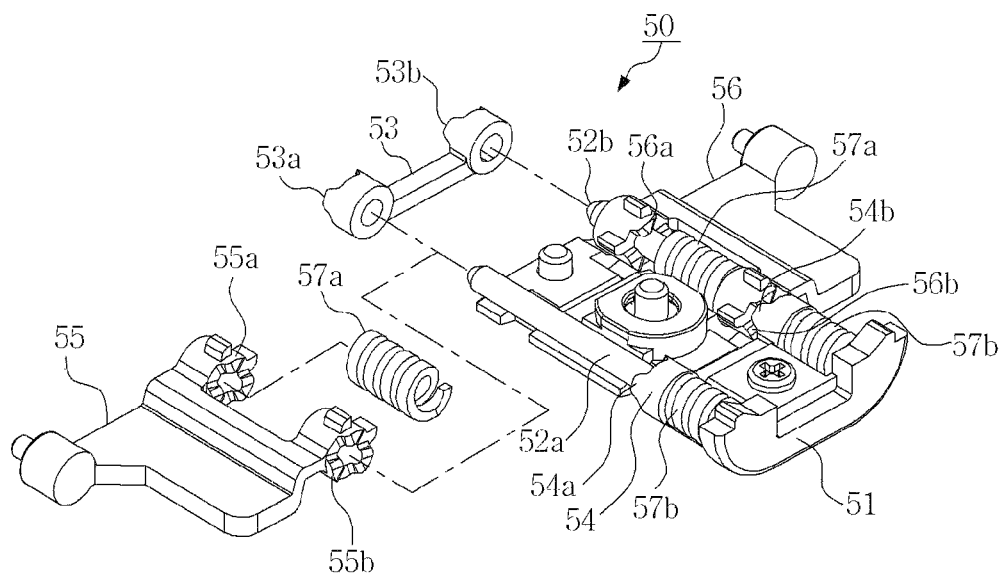
FIG. 9 is an exploded perspective view showing a tension mechanism of the hinge device according to the present invention.

FIG. 9 is a partially exploded perspective view showing the tension mechanism 50 separated from the hinge device 14 according to the present invention.

As shown, the tension mechanism 50 includes a tension fixing member 51 fixed to the hinge cover 32 (See FIG. 3) and having first and second guide shafts 52a and 52b disposed thereon in the direction of a hinge axial line. Further, the tension mechanism 50 includes tension operating members 53 and 54 movably fitted to the first and second guide shafts 52a and 52b in axial directions and having a plurality of inclined protrusions 53a, 53b, 54a, and 54b protruding therefrom in the direction of the hinge axial line in such a manner as to be arranged in circumferential directions around the first and second guide shafts 52a and 52b.

Further, the tension mechanism 50 includes first and second tension blades 55 and 56 fitted to the first and second guide shafts 52a and 52b to supportedly rotate thereagainst and movable to the axial directions. The first and second tension blades 55 and 56 have inclined protrusions 55a, 56a, 55b, and 56b fitted correspondingly to the spaces between the neighboring inclined protrusions 53a, 53b, 54a, and 54b of the tension operating members 53 and 54.

Further, first springs 57a as elastic members are located at spaces between the tension operating member 53 and the rear surface of the inclined protrusions 55b, 56b of the first and second tension blade 55, 56, and second springs 57b as elastic members are located at spaces between the tension operating member 54 and the tension fixing member 51. The first and second springs 57a and 57b serve to constantly apply elastic forces so that the inclined protrusions 53a, 53b, 54a, and 54b of the tension operating members 53 and 54 are fitted to the inclined protrusions 55a, 56a, 55b, and 56b of the first and second tension blades 55 and 56.

Figure 10:
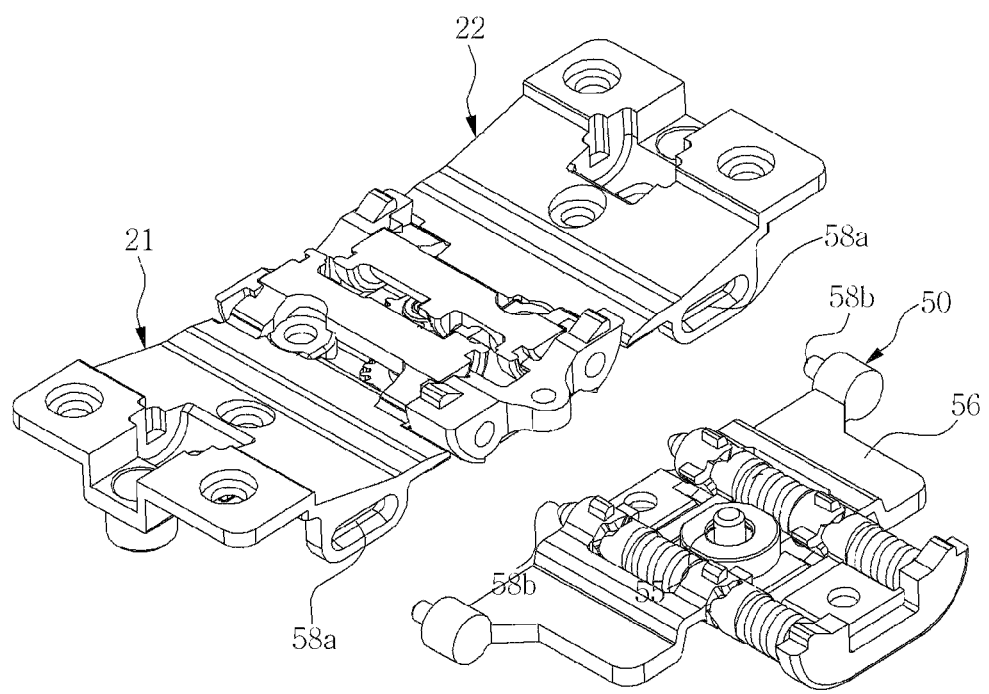
FIG. 10 is an exploded perspective view showing a connection structure between the tension mechanism and the first and second hinge blades in the hinge device according to the present invention.

FIG. 10 shows a connection structure between the tension mechanism 50 and the first and second hinge blades 21 and 22, and the connection structure includes rectangular tension guide holes 58a formed on one side of the first and second hinge blades 21 and 22 and tension guide protrusions 58b protruding from the first and second tension blades 55 and 56 of the tension mechanism 50 in such a way as to be slidingly fitted to the tension guide holes 58a.

Accordingly, the first and second tension blades 55 and 56 of the tension mechanism 50 interlock with the first and second hinge blades 21 and 22 and thus rotate between the 'unfolding position' and the 'folding position', together with the first and second hinge blades 21 and 22. In this case, the tension guide protrusions 58b formed on the first and second tension blades 55 and 56 rotating around the first and second guide shafts 52a and 52b slidably move along the rectangular tension guide holes 58a formed on the first and second hinge blades 21 and 22, so that the first and second tension blades 55 and 56 rotate interlockingly with the first and second hinge blades 21 and 22 changing in position relative to each other during the rotation between the 'unfolding position' and the 'folding position'.

The tension mechanism 50 is configured to allow the inclined protrusions 55a, 56a, 55b, and 56b of the first and second tension blades 55 and 56 to be fitted to or escape from the inclined protrusions 53a, 53b, 54a, and 54b of the tension operating members 53 and 54 according to the rotations of the first and second tension blades 55 and 56 (See FIGS. 12a and 12b), so that the elastic forces of the first and second springs 57a and 57b are increased or decreased to cause the rotations of the first and second bodies 11 and 12 to be easily performed with small forces at the 'unfolding position' or the 'folding position', while the free-stop function is being performed between the 'unfolding position' and the 'folding position'.

If the rotating force is removed during the rotations of the first and second bodies 11 and 12 to the 'unfolding position' or the 'folding position' to thus stop the rotations, the free-stop function enables the first and second bodies 11 and 12 to be kept at the positions where the rotations are stopped.

Figure 12A:
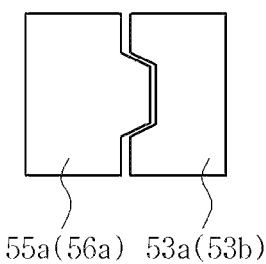
FIGS. 12a and 12b are views showing the operating states of the tension mechanism of the hinge device according to the present invention.
Figure 12B:
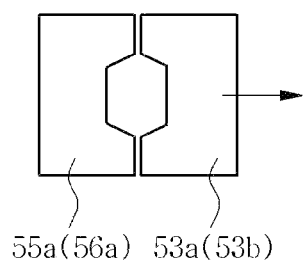

If the maximum curved portions of the inclined protrusions 53a, 53b, 54a, and 54b of the tension operating members 53 and 54 are located in position to face the maximum curved portions of the inclined protrusions 55a, 56a, 55b, and 56b of the first and second tension blades 55 and 56 according to the rotations of the first and second tension blades 55 and 56, the first and second springs 57a and 57b are compressed so that through the compressed elastic forces, the free-stop function is performed to allow the first and second bodies 11 and 12 to be kept at the positions where the rotations are stopped (See FIGS. 12a and 12b).

Figure 11:
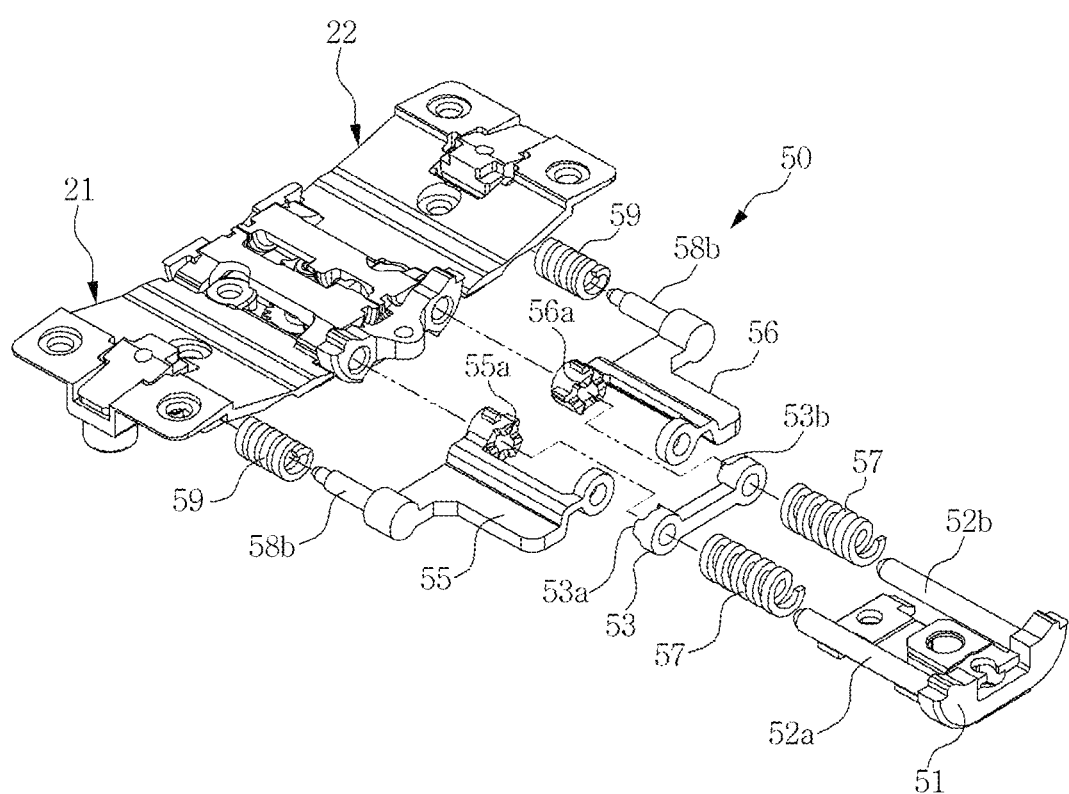
FIG. 11 is an exploded perspective view showing another example of the tension mechanism of the hinge device according to the present invention.

FIG. 11 is an exploded perspective view showing another example of the tension mechanism of the hinge device according to the present invention. Unlike the tension mechanism as shown in FIG. 9, the tension mechanism as shown in FIG. 11 has only the springs 57 located between the tension operating member 53 and the tension fixing member 51, thereby allowing a distance between both sides of the hinge device 14 to be increased. Accordingly, it is easy to locate signal wires and the hinge device is simple in configuration to improve assemblability and durability thereof. Further, springs 59 as elastic members are additionally fitted to the tension guide protrusions 58b of the first and second tension blades 55 and 56 in such a way to elastically come into close contact with the first and second hinge blades 21 and 22 and the first and second tension blades 55 and 56. As a result, the springs 59 are located on the interlocking portions most distant from the rotary axial lines of the first and second tension blades 55 and 56, thereby more increasing the elastic forces with respect to the rotary torques of the first and second tension blades 55 and 56 when compared with the elastic forces generated from springs located close to the rotary axial lines. Further, the elastic forces collected to the rotary axial lines are distributed to improve the stability and durability of the tension mechanism 50.

An explanation of the tension mechanism 50 has been given above, but only if any device easily rotates the first and second bodies 11 and 12 with a small force and performs the free-stop function, it may be coupled to the interlocking means as mentioned above and thus applied to the present invention.

Under the above-mentioned configuration, now, an explanation of the operations of the hinge device according to the present invention will be given.

If the first and second bodies 11 and 12 move between the unfolding position and the folding position, as shown in FIGS. 5a and 5b, the semicircular grooves 21a and 22a of the first and second hinge blades 21 and 22 fixed to the first and second bodies 11 and 12 are guided by the semicircular protrusions 31a and 31b of the housing 31 and thus supportedly rotate, so that the operations for moving the first and second bodies 11 and 12 between the 'unfolding position' and the 'folding position' are gently performed.

Further, even though only one of the first body 11 and the second body 12 rotates, the other body moves relative to one body and thus rotates together with the rotating body through the first and second interlocking gears 41 and 42 as the interlocking means.

Figure 8A:
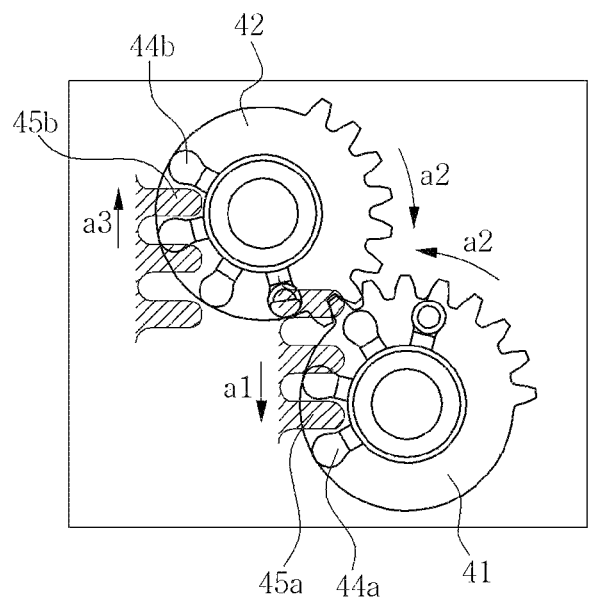
FIGS. 8a and 8b are top views showing operating states of the interlocking gears in the hinge device according to the present invention.

In specific, as shown in FIG. 8a, if only the first hinge blade 21 rotates to the 'folding position' to allow the first blade-side protrusions 45a of the first hinge blade 21 to rotate around the rotary axial line of the first hinge blade 21 and thus move to a direction of an arrow 'a1', the first gear-side protrusions 44a of the first interlocking gear 41 that engage with the first blade-side protrusions 45a rotate to a direction of an arrow 'a2', so that as the second gear-side protrusions 44b move to the direction of the arrow 'a2' by means of the second interlocking gear 42 engaging with the first interlocking gear 41, the second blade-side protrusions 45b of the second hinge blade 22 move to a direction of an arrow 'a3' to cause the second hinge blade 22 to rotate to the 'folding position', together with the first hinge blade 21.

Contrarily, even if the second blade-side protrusions 44b of the second hinge blade 22 move to the direction of the arrow 'a3', the first blade-side protrusions 45a of the first hinge blade 21 move to the direction of the arrow 'a1' by means of the first and second gear-side protrusions 44a and 44b of the first and second interlocking gears 41 and 42, and accordingly, the first hinge blade 21 interlocks with the second hinge blade 22.

Figure 8B:
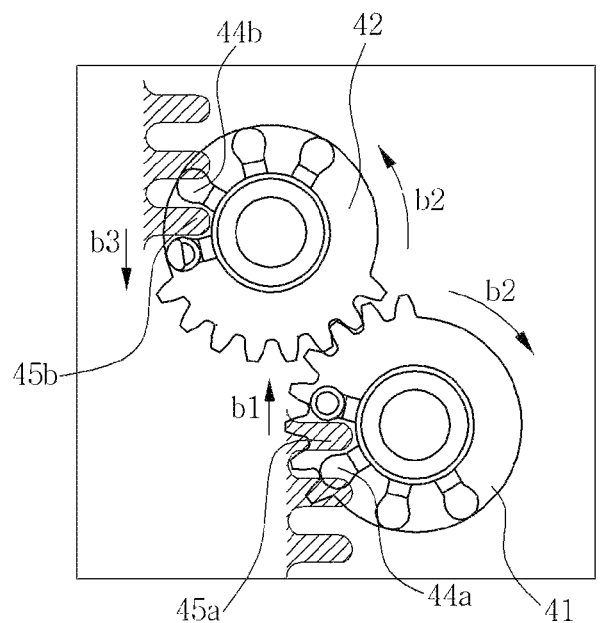

In the same manner as above, as shown in FIG. 8b, if only the first hinge blade 21 rotates to the 'unfolding position' to allow the first blade-side protrusions 45a of the first hinge blade 21 to move to a direction of an arrow 'b1', the first interlocking gear 41 rotates to a direction of an arrow 'b2' by means of the first gear-side protrusions 44a, and further, the second gear-side protrusions 44b rotate to the direction of the arrow 'b2' by means of the second interlocking gear 42 engaging with the first interlocking gear 41, so that as the second blade-side protrusions 45b of the second hinge blade 22 move to a direction of an arrow 'b3', the second hinge blade 22 moves to the 'unfolding position', together with the first hinge blade 21.

Contrarily, even if the second blade-side protrusions 45b of the second hinge blade 22 move to the direction of the arrow 'b3', the first blade-side protrusions 45a of the first hinge blade 21 move to the direction of the arrow 'b1' by means of the first and second gear-side protrusions 44a and 44b of the first and second interlocking gears 41 and 42, and accordingly, the first hinge blade 21 interlocks with the second hinge blade 22.

In FIGS. 8a and 8b, the first and second blade-side protrusions 45a and 45b interlock with the first and second gear-side protrusions 44a and 44b of the first and second interlocking gears 41 and 42 rotating in the direction of the arrow a2 or b2 and thus linearly move in the directions of the arrow a1 or b1 and the arrow a3 or b3 on the plane, but since the first and second blade-side protrusions 45a and 45b are arranged radially in the circumferential directions around the rotary axial lines of the first and second hinge blades 21 and 22, the first and second hinge blades 21 and 22 having the first and second blade-side protrusions 45a and 45b rotate to the 'folding position' or the 'unfolding position' along the semicircular grooves 21a and 22a and the semicircular protrusions 31a and 31b as the rotation-supporting structure.

The hinge device 14 of the present invention is configured to allow the free-stop function to be performed by the tension mechanisms 50 when the rotating positions of the first and second bodies 11 and 12 are between the 'unfolding position' and the 'folding position'.

As shown in FIGS. 9 and 10, each tension mechanism 50 is configured to allow the tension guide protrusions 58b of the first and second tension blades 55 and 56 to be guided along the tension guide holes 58a of the first and second hinge blades 21 and 22, so that upon the rotations of the first and second hinge blades 21 and 22, the first and second tension blades 55 and 56 rotate interlockingly with the first and second hinge blades 21 and 22.

When the first and second hinge blades 21 and 22 are at the 'folding position' or the 'unfolding position', accordingly, the inclined protrusions 55a, 56a, 55b, and 56b of the first and second tension blades 55 and 56 are fitted between the inclined protrusions 53a, 53b, 54a, and 54b of the tension operating members 53 and 54 (See FIG. 12a), and the first and second springs 57a and 57b are expanded. As a result, the elastic forces of the first and second springs 57a and 57b for pressurizing the first and second hinge blades 21 and 22 toward the directions of the hinge axial lines are reduced to allow the first and second hinge blades 21 and 22 to easily rotate with a small force.

When the first and second hinge blades 21 and 22 are between the 'folding position' and the 'unfolding position', further, the inclined protrusions 55a, 56a, 55b, and 56b of the first and second tension blades 55 and 56 escape from the inclined protrusions 53a, 53b, 54a, and 54b of the tension operating members 53 and 54 by the rotations of the first and second tension blades 55 and 56 to allow the tension operating members 53 and 54 to pressurizedly move in the directions of the hinge axial lines (See FIG. 12b)

Accordingly, the tension operating members 53 and 54 move along the first and second guide shafts 52a and 52b to allow the first and second springs 57a and 57b to be compressed. As a result, the elastic forces of the first and second springs 57a and 57b for pressurizing the tension operating members 53 and 54 toward the first and second tension blades 55 and 56 are increased, and through the increased elastic forces, accordingly, the free-stop function is performed to allow the first and second bodies 11 and 12 to be kept at the positions where the rotations are stopped when the first and second bodies 11 and 12 are stopped, while rotating.

The hinge device of the present invention may be applied to all types of devices having foldable hinge structures such as laptop computers as well as the portable terminals such as smartphones.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A hinge device comprising:
a housing positioned between one end of a first body and one end of a second body;
a first hinge blade and a second hinge blade fixed to the first body and the second body, respectively, and supported against the housing to rotate at a first predetermined angle between an unfolded position in which the first body and the second body are disposed horizontally and a folded position in which the first body and the second body face each other and thus come into contact with each other; and
a first interlocking gear and a second interlocking gear for interlocking the first hinge blade and the second hinge blade with each other so that the first hinge blade and the second hinge blade are configured to move with respect to each other,
wherein the first interlocking gear and the second interlocking gear are mounted on the housing so as to rotate with respect to each other at a second predetermined angle around gear shafts by engaging with each other, on an upper side of each of the first interlocking gear and the second interlocking gear, a plurality of first gear-side protrusions and a plurality of second gear-side protrusions are respectively arranged radially in circumferential directions around the gear shafts, and on a lower side of each of the first hinge blade and the second hinge blade, a plurality of first blade-side protrusions and a plurality of second blade-side protrusions respectively engaging with the plurality of first gear-side protrusions and the plurality of second gear-side protrusions through rotations are respectively arranged radially in circumferential directions around rotary axes of the first and second hinge blades.

2. The hinge device according to claim 1, wherein the plurality of first gear-side protrusions and the plurality of second gear-side protrusions respectively protrude upwardly from a top of each of the first interlocking gear and the second interlocking gear.

3. The hinge device according to claim 1, wherein ends of the plurality of first gear-side protrusions and the plurality of second gear-side protrusions and ends of the plurality of first blade-side protrusions and the plurality of second blade-side protrusions are semicircular or hemispherical.

4. The hinge device according to claim 1, wherein each of the first interlocking gear and the second interlocking gear is a partial gear including a tooth portion in which teeth of each of the first and second interlocking gears are formed and a non-tooth portion in which smooth surfaces of each of the first and second interlocking gears are formed such that the plurality of first gear-side protrusions are disposed on the non-tooth portion of the first interlocking gear and the plurality of second gear-side protrusions are disposed on the non-tooth portion of the second interlocking gear.

5. The hinge device according to claim 1, wherein the gear shafts of the first interlocking gear and the second interlocking gear are spaced apart from each other in a diagonal direction with respect to a center line of the housing.

6. The hinge device according to claim 1, wherein a pair of semicircular protrusions are formed on both sides of the housing, and semicircular grooves are formed on the first hinge blade and second hinge blade, respectively, to be rotated by fitting the semicircular protrusions thereto.

7. The hinge device according to claim 6, wherein the pair of semicircular protrusions are spaced apart from each other by a predetermined distance to allow a given curvature radius formed on a folding portion of a flexible display panel to be accommodated in the predetermined distance at the folded position.

8. The hinge device according to claim 1, further comprising a tension mechanism comprising a tension fixing member having a first guide shaft and a second guide shaft disposed thereon in a direction of a hinge axial line, a first tension blade and a second tension blade respectively fitted to the first guide shaft and the second guide shaft, configured to rotate supportedly thereagainst, and movable to axial directions, tension operating members movably respectively fitted to the first guide shaft and the second guide shaft in the axial directions, and elastic members for applying elastic forces to the tension operating members.

9. The hinge device according to claim 8, wherein a plurality of inclined protrusions are formed respectively on the tension operating members in circumferential direction around the first guide shaft and the second guide shaft, and another plurality of inclined protrusions that can be fitted corresponding to the plurality of inclined protrusions are formed respectively on the first tension blade and the second tension blade.

10. The hinge device according to claim 8, wherein the tension mechanism has tension guide protrusions protruding from the first tension blade and the second tension blade, respectively, and the tension guide protrusions are inserted into and guided in rectangular tension guide holes formed on one side of each of the first hinge blade and the second hinge blade.

11. The hinge device according to claim 8, further comprising springs respectively installed between each of rectangular tension guide holes of the first and the second hinge blades and each of tension guide protrusions of the first and the second tension blades.

* * * * *